(No Model.) 2 Sheets—Sheet 2.
Z. T. WHITE.
CORN PLANTER.
No. 371,867. Patented Oct. 18, 1887.
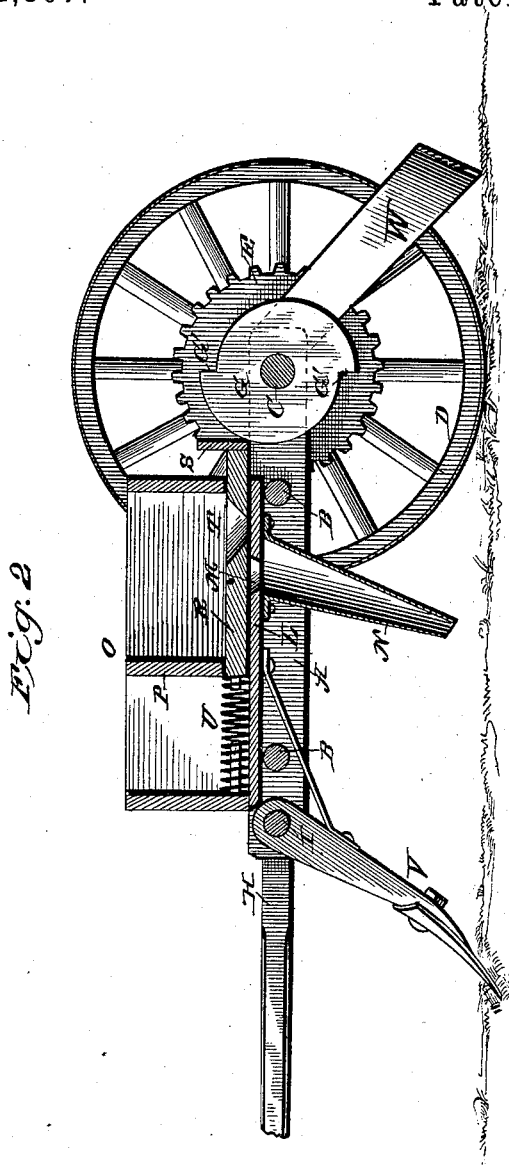
Witnesses
Jos. A. Ryan
J. W. Garner
Inventor
Zachary T. White
By his Attorneys
C. A. Snow & Co.

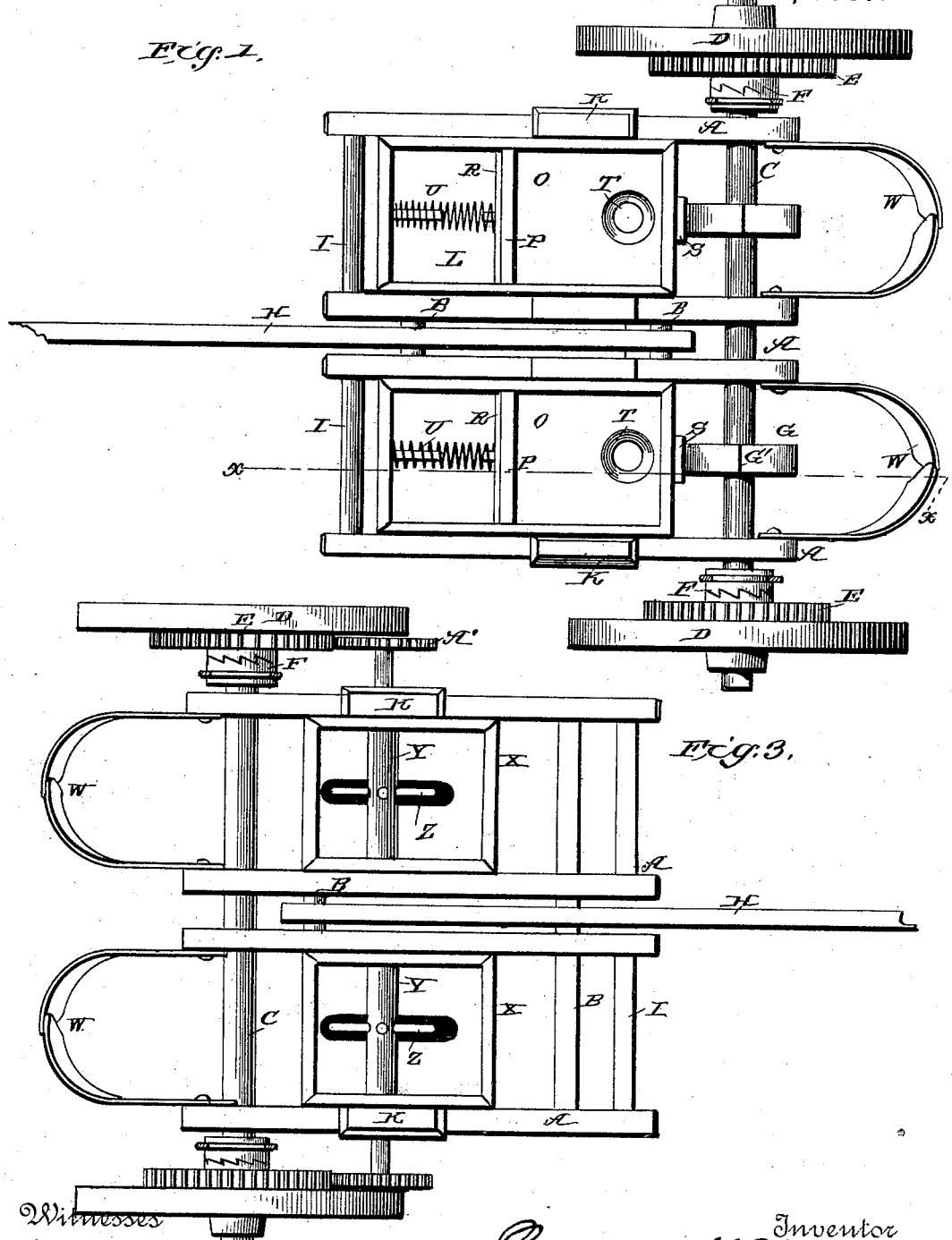

UNITED STATES PATENT OFFICE.

ZACHARY TAYLOR WHITE, OF HARTSVILLE, TENNESSEE.

CORN-PLANTER.

SPECIFICATION forming part of Letters Patent No. 371,867, dated October 18, 1887.

Application filed May 4, 1887. Serial No. 237,103. (No model.)

*To all whom it may concern:*

Be it known that I, ZACHARY TAYLOR WHITE, a citizen of the United States, residing at Hartsville, in the county of Trousdale and State of Tennessee, have invented a new and useful Improvement in Cotton and Corn Planters, of which the following is a specification.

My invention relates to an improvement in cotton and corn planters; and it consists in the peculiar construction and combination of devices, that will be more fully set forth hereinafter, and particularly pointed out in the claim.

In the drawings, Figure 1 is a top plan view of a planter embodying my improvements when adapted for use in planting corn. Fig. 2 is a vertical longitudinal sectional view of the same, taken on the line $x\ x$ of Fig. 1. Fig. 3 is a top plan view of my invention when adapted for use as a cotton-planter.

A represents a series of four longitudinal beams, which are arranged parallel with each other, and are connected together in pairs by cross-bars B. In the rear ends of the beams A are made aligned transverse openings, through which extends a transverse shaft, C. On the ends of the shaft are loosely mounted supporting-wheels D, on the inner sides of which are rigidly secured gear-wheels E.

F represents sliding clutches arranged on the projecting spindles of the shaft C and adapted to engage the wheels E, so as to lock the latter to the shaft, and thereby cause the same to be rotated by the supporting-wheels when the machine advances.

G represents eccentric cams, which are rigidly secured to the shaft C midway between each pair of longitudinal beams A. The said cams are each provided with two offsets or shoulders, G', which are arranged at diametrically-opposite points on the perimeters of the cams, and the offsets or shoulders G' on the two cams are in line with each other.

H represents a tongue which has its rear end attached to the cross-bars B midway between the pairs of beams A.

Each pair of beams A is connected in front by a transverse bar, I. From the outer beams A project vertical standards K, to which the hoppers are secured.

L represents a pair of base-boards which are adapted to fit between the opposing sides of each pair of beams A, and to rest upon the cross-bars B. Near the rear ends of the base-boards are vertical openings M, and communicating with the said openings are depending seed-spouts N.

O represents a pair of hoppers which are secured on the base-boards L, which base-boards form the lower sides of the hoppers, and the outer sides of the hoppers are secured to the standards K, as shown. Near the front ends of the hoppers are vertical partition-boards P.

R represents seed-slides arranged on the bottoms of the hoppers and adapted to reciprocate in the apartments therein formed in rear of the partition-boards P. The rear ends of these slides project rearward beyond the hoppers and are provided with shoes S, that bear against the peripheries of the cams G. Each seed-slide has a discharge-opening, T, which is adapted to register with the discharge-openings M in the base-board L when the slides are moved forward.

U represents coiled extensile springs, which are placed in the lower sides of the front compartments of the hopper and bear against the front end of the seed-slides, the function of these springs being to normally move the seed-slides rearwardly.

V represents furrow-openers arranged under the hoppers in front of the seed-spouts, and W represents coverers attached to the rear ends of the beams A and adapted to cover the seed.

The operation of my invention is as follows: The corn to be planted is placed in the hoppers and the machine is drawn across the field. At each semi-revolution of the driving-wheel the cams G move the seed-slides forward to cause their openings T to align with the openings N, and thereby drop a planting of seeds through the seed-spout into the furrows made by the furrow-openers, and the said furrows are immediately covered by the coverers, hereinbefore described. The space between the discharge-openings M in the hoppers is equal to one-half the circumference of the supporting-wheels, and inasmuch as the seed-slides are operated twice at each rotation of the supporting-wheels, it follows that the hills of corn will be planted at regular distances apart both ways, thereby effectually checkrowing the corn, so that it may be plowed both ways when cultivated.

In Fig. 3 I illustrate my invention adapted for use as a cotton-planter, in which the hoppers O are removed and hoppers X are substituted in lieu thereof. The said hoppers X are provided in their lower sides with elongated discharge-openings, and shafts Y are journaled transversely in the hoppers and provided with radial stirring-arms Z adapted to sweep through the discharge-openings. The outer ends of the shafts Y have pinions A', which mesh with the spur-wheels E, and thereby, when the machine progresses, the shafts Y will be rotated in the hoppers and cause the arms Z to stir the cotton-seeds placed therein, and cause the said seeds to be dropped through the discharge-openings in the bottom of the hoppers into the furrows made by the furrow-openers before described, and the coverers working in rear of the furrow-openers cover the seeds.

Having thus described my invention, I claim—

The improved corn-planter herein described and shown, comprising the longitudinal beams A, the bars B, connecting the same in pairs, the tongue secured to the bars B between the pairs of beams, the base-boards L, secured upon the bars B between the beams A and having the discharge-openings M near their rear ends, the standards K, secured upon the outer beams A, the seed-spouts N, depending from the base-boards in alignment with the discharge-openings M, the hoppers secured to the standards K and arranged over the base-boards L, and having transverse partition-boards P, the seed-slides in the bottoms of the hoppers, having the shoes S on their rear ends, the springs U in the hoppers, having their ends bearing against the front edges of the seed-slides and the front sides of the hoppers, the shaft C, journaled in the rear ends of the beams A and having the cams G, bearing against the shoes S, the furrow-openers V, secured to the forward part of the beams A, and the coverers W, secured to the rear ends of said beams, substantially as specified.

In testimony that I claim the foregoing as my own I have hereto affixed my signature in presence of two witnesses.

ZACHARY TAYLOR WHITE.

Witnesses:
 ROBT. ANDREWS,
 WALTER ANDREWS.